United States Patent
Cui et al.

(10) Patent No.: US 9,621,038 B2
(45) Date of Patent: Apr. 11, 2017

(54) SWITCH CONTROL CIRCUIT AND CONVERTER USING THE SAME

(71) Applicant: Magnachip Semiconductor, Ltd., Cheongju-si (KR)

(72) Inventors: Zhi Yuan Cui, Cheongju-si (KR); Youn Ggi Ryu, Seoul (KR); Doo Soo Shin, Seoul (KR); In Ho Hwang, Incheon (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 121 days.

(21) Appl. No.: 14/624,999

(22) Filed: Feb. 18, 2015

(65) Prior Publication Data
US 2015/0293545 A1 Oct. 15, 2015

(30) Foreign Application Priority Data
Apr. 15, 2014 (KR) ................. 10-2014-0044770

(51) Int. Cl.
G05F 1/46 (2006.01)
H02M 3/156 (2006.01)
H02M 3/155 (2006.01)

(52) U.S. Cl.
CPC .............. *H02M 3/156* (2013.01); *G05F 1/46* (2013.01); *H02M 2003/1555* (2013.01)

(58) Field of Classification Search
CPC . G05F 1/46; H02M 2003/1555; H02M 3/156; H02M 3/155; H05B 33/0818; H05B 33/0815
See application file for complete search history.

(56) References Cited

U.S. PATENT DOCUMENTS

| | | | | |
|---|---|---|---|---|
| 7,863,836 | B2 * | 1/2011 | Mednik | H05B 33/0815 315/224 |
| 8,120,335 | B2 | 2/2012 | Caldwell | |
| 8,536,790 | B2 * | 9/2013 | Inoue | H05B 33/0815 315/209 R |
| 8,907,580 | B2 * | 12/2014 | Mednik | H05B 33/0815 315/209 R |
| 9,337,725 | B2 * | 5/2016 | Mednik | H02M 3/156 |
| 9,496,703 | B2 * | 11/2016 | Shin | H05B 33/0815 |
| 9,502,975 | B2 * | 11/2016 | Shin | H02M 3/156 |

(Continued)

*Primary Examiner* — Fred E Finch, III
*Assistant Examiner* — Demetries A Gibson
(74) *Attorney, Agent, or Firm* — NSIP Law

(57) ABSTRACT

A switch control circuit for controlling an average current flowing into a load through a current control switch that is series-coupled to an input power and the load includes a sensing unit configured to measure a current flowing into the load, a folder unit configured to fold a sensing signal related to the measured current based on a first reference voltage to generate first and second folder output signals based on an initialization voltage, the first and second folder output signals being symmetric to each other, a comparison unit configured to compare the generated first and second folder output signals and a control unit configured to control an operation of the current control switch according to a comparison result in the comparison unit. Such a switch control circuit integrates and compares a sensing signal and a reference signal to effectively perform an average current control.

22 Claims, 7 Drawing Sheets

(56) References Cited

U.S. PATENT DOCUMENTS

| | | | |
|---|---|---|---|
| 2008/0180973 A1* | 7/2008 | Park | H02M 3/33523 363/21.01 |
| 2011/0062932 A1* | 3/2011 | Hawkes | H02M 3/156 323/288 |
| 2013/0051089 A1* | 2/2013 | Pan | H02M 1/44 363/21.17 |
| 2014/0197884 A1* | 7/2014 | Cohen | H02M 3/156 327/543 |

* cited by examiner

SWITCH CONTROL CIRCUIT AND CONVERTER USING THE SAME

CROSS-REFERENCE TO RELATED APPLICATIONS

This application claims the benefit under 35 U.S.C. §119 (a) of Korean Patent Application No. 10-2014-0044770 filed on Apr. 15, 2014, in the Korean Intellectual Property Office, the entire disclosure of which is incorporated herein by reference for all purposes.

BACKGROUND

1. Field

The following description relates to a switch control technology and to a switch control circuit, method, and a converter using the switch control technology and capable of controlling a stable average current in Continuous Current Mode (CCM) regardless of an input change, a load change, or a switching off-time.

2. Description of Related Art

A power supply is an apparatus that supplies a power to a load. A buck converter is a voltage step down and current step up converter. For example, when a buck converter is used as a type of power supply, a buck converter corresponds to a step-down DC-DC converter. That is, such a buck converter is a converter that outputs a voltage that is lower than an input voltage. The buck converter uses an inductor and two switches, for example, a transistor and a diode, where these switches control the inductor to repeatedly perform a procedure of storing energy in an inductor and a procedure of discharging the stored energy from the inductor into a load.

A linear regulator may be used to lower the voltage of a DC power supply. However, the linear regulator has an issue that waste of energy is high because of an extra power being transformed into waste heat. Meanwhile, when the buck converter is implemented as an integrated circuit, the buck converter is frequently used because at least 95% of source power can be converted. Hence, wasted power is kept relatively low.

The buck converter coupled with a Light Emitting Diode (LED) includes a switch controlling the current flowing into the LED, a sensing circuit that measures the load current, where for example the sensing circuit is series-coupled to the LED and an inductor, and a control circuit controlling the switch based on the measured load current to control that constantly maintains a load average current.

Certain technologies relate to average inductor current mode switching converters and other technologies relate to a control circuit and a method for regulating an average inductor current in a switching converter. These technologies disclose a control circuit controlling a load current on a power supply.

FIG. 1 illustrates a waveform diagram of a control switch current controlled by a control circuit.

Referring to FIG. 1, an x-axis represents a time and a y-axis represents an amplitude of a current.

Such a control circuit measures a current flowing into a load through a sensing circuit and stores a time when the sensed current reaches a predefined reference current REF. For example, a control circuit stores a reach time T1, where the reach time T1 indicates a time from when a switch controlling a current is turned on to when the sensed current reaches the predefined reference current REF.

The control circuit of this example counts a reach time T1 stored at a time when a sensed current reaches the predefined reference current REF and turns off a switch at an elapsed time T2 as a reached time. Thus, the average current of a such a load current is maintained at a predefined reference current REF.

In such a control circuit, a load current is assumed to constantly increase. However, when the load current does not constantly change in such a manner, the circuit has an aspect that it is difficult to control the average current so that the average current is the same as the reference current.

Also, this control circuit includes an intermediate operational circuit for determining a reach time when the sensed current reaches the reference current and storing the determined reach time. Therefore, such an example has issues that a delay time for a current control is involved and it is difficult to control the average current according to a change of the input power and the load to achieve successful operation of such a control circuit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a switch control technology for a power supply device capable of quickly and accurately performing average current control.

Examples provide a switch control technology for a power supply device capable of performing current control in real time.

In one general aspect, a switch control circuit for controlling an average current flowing into a load through a current control switch that is series-coupled to an input power and the load includes a sensing unit configured to measure a current flowing into the load, a folder unit configured to fold a sensing signal related to the measured current based on a first reference voltage to generate first and second folder output signals based on an initialization voltage, the first and second folder output signals being symmetric to each other, a comparison unit configured to compare the generated first and second folder output signals, and a control unit configured to control an operation of the current control switch according to a comparison result of the comparison unit.

The control unit may be coupled to the current control switch, turn off the current control switch at a time at which the comparison result in the comparison unit is that the compared signals are the same and turn on the current control switch in response to a predefined off-time elapsing from a time when the current control switch is turned off.

The sensing unit may include a sensing resistor coupled between one terminal of the current control switch and a reference voltage, and measure a voltage at both sides of the sensing resistor.

The folder unit may include an input signal folder unit configured to fold the measured sensing signal according to a control signal to generate a first folder output signal, a symmetrical folder output signal generation unit configured to generate a second folder signal based on the first folder output signal according to the control signal, and a folder control unit configured to compare the measured sensing signal and the first reference voltage to generate the control signal, wherein the control signal controls operation of the input signal folder unit and the symmetrical folder output signal generation unit.

The folder control unit may include a differential amplifier configured to convert an amplitude or a phase of the control signal when the measured sensing signal and the first reference voltage are the same.

The folder unit may include a first dependent current source configured to be proportional to the measured sensing signal, a second dependent current source configured to decrease in proportion to the measured sensing signal with reference to the first reference voltage, a first capacitor that is series-coupled to the first and second dependent current sources, and first and second switches configured to operate exclusively according to the control signal so as to couple each of the first and second dependent current sources to the first capacitor, wherein the folder unit outputs a charged voltage from the first capacitor as the first folder output signal.

The symmetrical folder output signal generation unit may include a third dependent current source configured to decrease in proportion to the measured sensing signal with reference to the first reference voltage, a fourth dependent current source configured to be proportional to the measured sensing signal, a second capacitor that is series-coupled to the third and fourth dependent current sources, and third and fourth switches configured to operate exclusively according to the control signal so as to couple each of the third and fourth dependent current sources to the second capacitor, wherein the symmetrical folder output signal generation unit outputs a charged voltage from the second capacitor as the second folder output signal.

The switch control circuit may further include an initialization circuit that is series-coupled to at least one of the first and second capacitors so as to initialize at least one of the first and second folder output signals.

The folder control unit may include a differential amplifier configured to convert an amplitude and a phase of the control signal in response to the measured sensing signal and the first reference voltage being the same, and a sampling unit configured to sample the measured sensing signal at a specific time so as to hold the sampled sensing signal during a specific interval and to output the held sensing signal as a second reference voltage.

The input signal folder unit may include a first dependent current source configured to be proportional to a difference between the measured sensing signal and the second reference voltage, a second dependent current source configured to decrease in proportion to the measured sensing signal, based on a difference of the first and second reference voltages, a first resistor that is series-coupled to the first and second dependent current sources, and first and second switches configured to operate exclusively according to the control signal so as to couple each of the first and second dependent current sources to the first resistor, wherein the input signal folder unit outputs a voltage that is applied to the first resistor as the first folder output signal.

The symmetrical folder output signal generation unit may include a third dependent current source configured to decrease in proportion to the measured sensing signal based on a difference between the first and second reference voltages, a fourth dependent current source configured to be proportional to the difference between the measured sensing signal and the second reference voltage, a second resistor that is series-coupled to the third and fourth dependent current sources, and third and fourth switches configured to operate exclusively according to the control signal so as to couple each of the third and fourth dependent current sources to the second resistor, wherein the symmetrical folder output signal generation unit outputs a voltage that is applied to the second resistor as the second folder output signal.

The switch control circuit may further include an initialization circuit that is series-coupled to at least one of the first and second resistors so as to initialize at least one of the first and second folder output signals.

The control unit may include an off-time control unit configured to count a predefined off-time from a time at which the current control switch is turned off, and a switch driving unit configured to control the current control switch based on an output of the comparison unit and an output of the off-time control unit.

The switch driving unit may include an SR latch that performs NOR or NAND logic operations on outputs of the comparison unit and the off-time control unit.

In another general aspect, a switch control circuit for controlling an average current flowing into a load through a current control switch that is series-coupled to an input power and the load includes a sensing unit configured to measure a current flowing into the load, a folder unit configured to fold a sensing signal related to the measured current based on a first reference voltage to generate first and second folder output signals based on the first reference voltage, the first and second folder output signals being symmetric to each other, a comparison unit configured to perform an AND logical operation on a comparison result and a folder signal and to output the AND operation result, the comparison result being generated by comparing the generated first and second folder output signals and the folder signal being generated by comparing the sensing signal and the first reference voltage, and a control unit configured to control an operation of the current control switch according to a comparison result of the comparison unit.

The folder unit may include an input signal folder unit configured to fold the measured sensing signal according to a control signal so as to generate a first folder output signal, a symmetrical folder output signal generation unit configured to generate a second folder signal based on the first folder output signal, according to the control signal, and a folder control unit configured to compare the measured sensing signal and the first reference voltage to generate the control signal, wherein the control signal controls operation of the input signal folder unit and the symmetrical folder output signal generation unit.

The input signal folder unit may include a first dependent current source configured to decrease in proportion to a difference between the first reference voltage and the measured sensing signal, a second dependent current source configured to decrease in proportion to the measured sensing signal based on a difference of the first and second reference voltages, a first resistor that is series-coupled to the first and second dependent current sources, and first and second switches configured to operate exclusively according to the control signal so as to couple each of the first and second dependent current sources to the first resistor, wherein the input signal folder unit outputs a voltage applied to the first resistor as the first folder output signal.

The symmetrical folder output signal generation unit may include a third dependent current source configured to increase in proportion to the measured sensing signal based on a difference between the second and first reference voltages, a fourth dependent current source configured to increase in proportion to the sensing signal, a second resistor that is series-coupled to the third and fourth dependent current sources, and third and fourth switches configured to operate exclusively according to the control signal so as to couple each of the third and fourth dependent current sources to the second resistor, wherein the symmetrical folder output signal generation unit outputs a voltage applied to the second resistor as the second folder output signal.

The control unit may include an off-time control unit configured to count a predefined off-time from a time when the current control switch is turned off, and a switch driving unit configured to control the current control switch based on an output of the comparison unit and an output of the off-time control unit.

The switch driving unit may include an SR latch that performs NOR or NAND logic operations on outputs of the comparison unit and the off-time control unit.

In another general aspect, a Continuous Current Mode (CCM) operation converter includes a load that is series-coupled to input power, an inductor that is series-coupled to the load, a current control switch that is series-coupled to the inductor to control a current flowing into the load, a free-wheeling diode that is parallel-coupled to the load and the series-coupled inductor, and a switch control circuit configured to control the current control switch, wherein the switch control circuit comprises a sensing unit configured to measure a current flowing into the load, a folder unit configure to fold a sensing signal related to the measured current based on a first reference voltage to generate first and second folder output signals based on an initialization voltage, the first and second folder output signals being symmetric to each other, a comparison unit configured to compare the generated first and second folder output signals, and a control unit configured to control an operation of the current control switch according to a comparison result of the comparison unit.

In another general aspect, a Continuous Current Mode (CCM) operation converter includes a load that is series-coupled to input power, an inductor that is series-coupled to the load, a current control switch that is series-coupled to the inductor to control a current flowing into the load, a free-wheeling diode that is parallel-coupled to the load and the series-coupled inductor, and a switch control circuit configured to control the current control switch, wherein the switch control circuit comprises a sensing unit configured to measure a current flowing into the load, a folder unit configured to fold a sensing signal related to the measured current based on a first reference voltage to generate first and second folder output signals based on the first reference voltage, the first and second folder output signals being symmetric to each other, a comparison unit configured to perform an AND logical operation on a comparison result and a folder signal and to output the AND operation result, the comparison result being generated by comparing the generated first and second folder output signals and the folder signal being generated by comparing the sensing signal and the first reference voltage, and a control unit configured to control an operation of the current control switch according to a comparison result of the comparison unit.

The described examples have the following advantages. However, this does not mean that all specific examples include all of the following advantages or that all specific examples are limited to just include the following advantages. The switch control technology according to an example may fold and compare a measured sensing signal to quickly and accurately perform average current control.

The switch control technology according to an example may perform current control in real time.

Other features and aspects will be apparent from the following detailed description, the drawings, and the claims.

Figure 1:
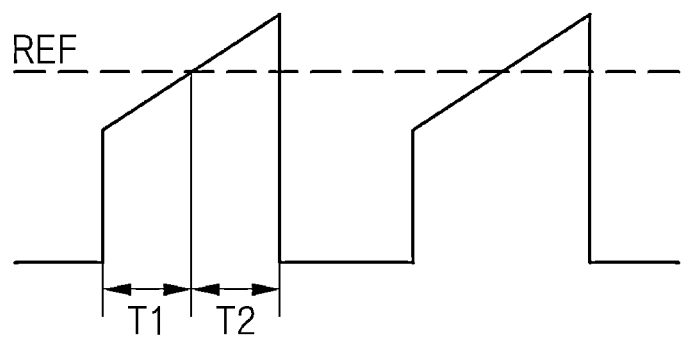
FIG. 1 is a waveform diagram of a control switch current controlled by a control circuit.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms described in the present disclosure are to be understood as follows.

While terms such as "first" and "second," etc., are used to describe various components, such components are not to be understood as being limited to the above terms. The above terms are used only to distinguish one component from another. For example, a first component may be referred to as a second component without departing from the scope of rights of the present disclosure, and likewise a second component may be referred to as a first component.

It is to be understood that when an element is referred to as being "coupled to" another element, the element is possibly directly coupled to the other element or intervening elements may also be present. In contrast, when an element is referred to as being "directly coupled to" another element, no intervening elements are present. Also, unless explicitly described to the contrary, the word "comprise" and variations such as "comprises" or "comprising," are to be understood to imply the inclusion of stated elements but not the exclusion of any other elements. Meanwhile, other expressions describing relationships between components such as "~between", "immediately ~between" or "adjacent to ~" and "directly adjacent to ~" are to be construed similarly.

Singular forms "a", "an," and "the" in the present disclosure are intended to include the plural forms as well, unless the context clearly indicates otherwise. It is to be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof exist or are potentially added.

The terms used in the present application are merely used to describe various examples, and are not intended to limit the present disclosure. Unless otherwise defined, all terms used herein, including technical or scientific terms, have the same meanings as those generally understood by those with ordinary knowledge in the field of art to which the present disclosure belongs in view of the present disclosure. Such terms as those defined in a generally used dictionary are to be interpreted to have the meanings equal to the contextual meanings in the relevant field of art, and are not to be interpreted to have ideal or excessively formal meanings unless clearly defined to have a specific meaning in the present disclosure.

Figure 2:
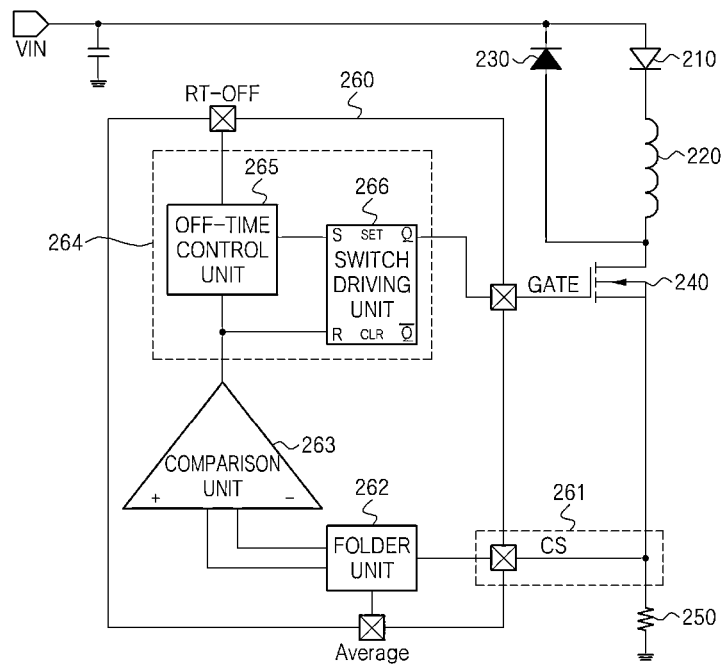
FIG. 2 is a circuit diagram illustrating a converter according to an example.

FIG. 2 is a circuit diagram illustrating a converter according to an example.

Referring to FIG. 2, a converter 200 includes a load 210, an inductor 220, a freewheeling diode 230, a current control switch 240 and a switch control circuit 260.

The converter 200 corresponds to a power supply, for example, a buck converter outputting a voltage that is lower than an input voltage.

The load 210 corresponds to an element that is series-coupled to an input voltage VIN to consume an energy. In an example, the load 210 is implemented as a Light Emitting Diode (LED) device.

The inductor 220 stores energy supplied by an input power or releases the stored energy according to an operation of the current control switch 240, which is described further, below. The inductor 220 induces a voltage that is proportional to an amount of change of a current flowing into the inductor 220 to suppress a sudden change of a current and stores an energy that is proportional to a square of the value of the current flowing into the inductor 220.

A capacity requirement of the inductor 220 is selected in response to turned-on and turned-off periods of the current control switch 240. In order to increase an operational frequency of the current control switch 240, a capacity of the inductor 220 is decreased.

The freewheeling diode 230 forms a current movement loop that provides a corresponding energy to the load 210 in response to the energy being emitted by the inductor 220. Furthermore, the freewheeling diode 230 causes flow of the stored energy in the inductor 220 into the load 210 to consume the stored energy from the inductor 220 when the current control switch 240 is turned off. Also, the freewheeling diode 230 prevents damage to the converter 200, such as damage caused by a spark, caused by the flow of the charged current from the inductor into the current control switch 240.

The current control switch 240 is series-coupled to the inductor 220 and repeatedly performs turn-on and turn-off operations in order to control a current amount flowing into the load 210.

Thus, the current control switch 240 is turned on or turned off by a control signal and selectively provides the current movement loop flowing into the inductor 220 with current according to the turned-on or turned-off state of the current control switch 240.

When the current control switch 240 is turned on, current flows into the inductor 220 by the input power, the energy accumulates in the inductor 220 and the current increasingly flows into the load 210.

Afterwards, in response to the current control switch 240 being turned off, the current movement loop is formed so that an inductor current, that is, the energy accumulated in the inductor 220, flows into the load 210 through the freewheeling diode 230 and the inductor current then decreases until the current control switch 240 is turned on. Meanwhile, in an example, the converter 200 repeatedly turns on and turns off the current control switch 240 so as to output a pulse-type current.

The switch control circuit 260 controls an operation of the current control switch 240. Thus, the switch control circuit 260 measures the current flowing into the load 210 and controls the operation of the current control switch 240 based on a reference voltage and a result of an integration operation integrating the measured current. Below, a switch control circuit 260 is described further.

Referring to FIG. 2, the switch control circuit 260 includes a sensing unit 261, a folder unit 262, a comparison unit 263 and a control unit 264.

The sensing unit 261 measures a current flowing into the load 210. Further, the sensing unit 261 includes a sensing resistor 250 coupled between one terminal of the current control switch 240 and a reference voltage and the sensing unit 261 measures a current flowing to the load 210 based on a voltage at both sides of the sensing resistor 250 or a voltage at CS terminals, as shown in FIG. 2.

In one example, the sensing unit 261 includes a VI converter, where a VI converter is a voltage-current converter, such that the VI converter converts a voltage signal to a current signal. In this example, the VI converter acts by converting a voltage at both sides of the sensing resistor to a measured current. In this example, the VI converter is installed in the switch control circuit 260 in a terminal for a current measurement. Meanwhile, in this example, the VI converter is arranged between the sensing unit 261 and the folder unit 262 and is included in the folder unit 262.

The folder unit 262 folds a measured sensing signal to generate a folder output signal. Further, the folder unit 262 folds the measured sensing signal based on a predefined first reference voltage VREF to generate first and second folder output signals that are symmetric with each other. As described in this example, folding represents a waveform substantially similar to a specific signal that is folded in a specific boundary. Also, the first reference voltage VREF, in an example, corresponds to a constant amplitude signal regardless of a change in time and is provided from an external source to the switch control circuit.

In one example, a positive field is defined as an area where an amplitude of the sensing signal is higher than that of the first reference voltage VREF and a negative field is defined as an area where an amplitude of the sensing signal is lower than that of the first reference voltage VREF. In such an example, the folder unit 262 generates first and second folder output signals that are respectively in the positive and negative fields and that are symmetrical with each other based on the initialization voltage VINIT.

In one example, the folder unit 262 generates the first and second folder output signals at a time at which the current control switch 240 is turned on according to the control of control unit 264 and the folder unit 262 is reset at a time at which the current control switch 240 is turned off.

In one example, the folder unit 262 respectively generates the first and second folder output signals such that the first and second folder output signals are increased and decreased in proportion to the measured sensing signal and folds each of the first and second folder output signals at a time when the first and second folder output signals reach a second reference current.

A detailed configuration and an output waveform of the folder unit 262 are described further later with reference to FIGS. 3 and 4.

The comparison unit 263 compares the first and second folder output signals generated in the folder unit 262.

In one example, the comparison unit 263 is implemented as an amplifier. For example, the comparison unit 263 is potentially implemented as a differential amplifier.

For example, the comparison unit 263 compares a first folder output signal, such as the folder output signal in the positive field, and a second folder output signal, such as the folder output signal in the negative field, to output a difference of these two input signals. For example, the comparison unit 263 calculates a value found by determining the value of the first folder output signal minus the value of the second folder output signal. Because an amplitude of the first folder output signal is higher than that of the second folder output signal at a time at which the current control switch 240 is turned on, the comparison unit 263 outputs a negative value. In an example, the comparison unit represents such a negative value as a low level or 0. As time passes, the comparison unit 263 subsequently outputs a positive value, which is potentially represented as a high level or 1, at a time when the first and second folder output signals become equal.

The control unit 264 controls the operation of the current control switch 240 according to the comparison result of the comparison unit 263.

In one example, the control unit 264 is coupled to the current control switch 240 and turns off the current control switch 240 in response to the comparison result of the comparison unit 263 being that the of inputs of the comparison unit 263 are the same. In this example, the control unit 264 is coupled to a GATE terminal of the current control switch 240.

Further, the control unit 264 generates a control signal that turns on the current control switch 240 to control the current control switch 240 so that the current control switch forms a current movement loop flowing a current to the load 210 by a input power.

Afterwards, the control unit 264 generates a control signal that turns off the current control switch 240 to cut off the current flowing into the current movement loop supplied by the input power when an output signal of the comparison unit 263 changes, such as from a positive value to a negative value. That is, a point of change occurs when the first and second folder output signals is the same.

Also, the control unit 264 generates a control signal for turning on the current control switch 240 so as to form a current movement loop that flows a current into the load 210 through the current control switch 240 supplied by the input power in response to a specific time elapsing from a turn-off time of the current control switch 240. For example the specific time is a predefined off-time at which the current control switch 240 is turned off.

In one example, the control unit 264 includes an off-time control unit 265 that counts the predefined off-time starting from a time at which the current control switch 240 is turned off. In this example, the off-time corresponds to a time starting from a time at which the current control switch 240 is turned off up to a time at which the current control switch 240 is turned off as discussed above.

In such an example, the off-time control unit 265 outputs a low level signal, for example, a signal having a value of 0, during a turn-off time or outputs a high level signal, for example, a signal having a value of 1, when the turn-off time elapses.

In one example, the off-time control unit 265 further includes a time set module that sets an off-time according to an external input or a specific program. For example, the off-time is potentially set by a user through an RT-OFF terminal.

In one example, the control unit 264 includes a switch driving unit 266 that controls the current control switch 240 based on outputs of the comparison unit 263 and the off-time control unit 265.

Further, the switch driving unit 266 performs a NOR or NAND logic operation on outputs of the comparison unit 263 and the off-time control unit 265 to output a control signal controlling the current control switch 240. By performing such a logic operation, the outputs of the comparison unit 263 and the off-time control unit 265 are able to successfully operate the current control switch 240.

In one example, the switch driving unit 266 is implemented as an SR latch that performs a NOR or NAND logic operation on outputs of the comparison unit 263 and the off-time control unit 265. A SR latch is a Set-Reset latch that is a circuit with two stable states that is used to store information and is constructed using cross-coupled logic gates, which may be NOR or NAND gates, where one input is the set (S) input and the other input is the reset (R) input, and the SR latch outputs Q as its output.

Figure 10:
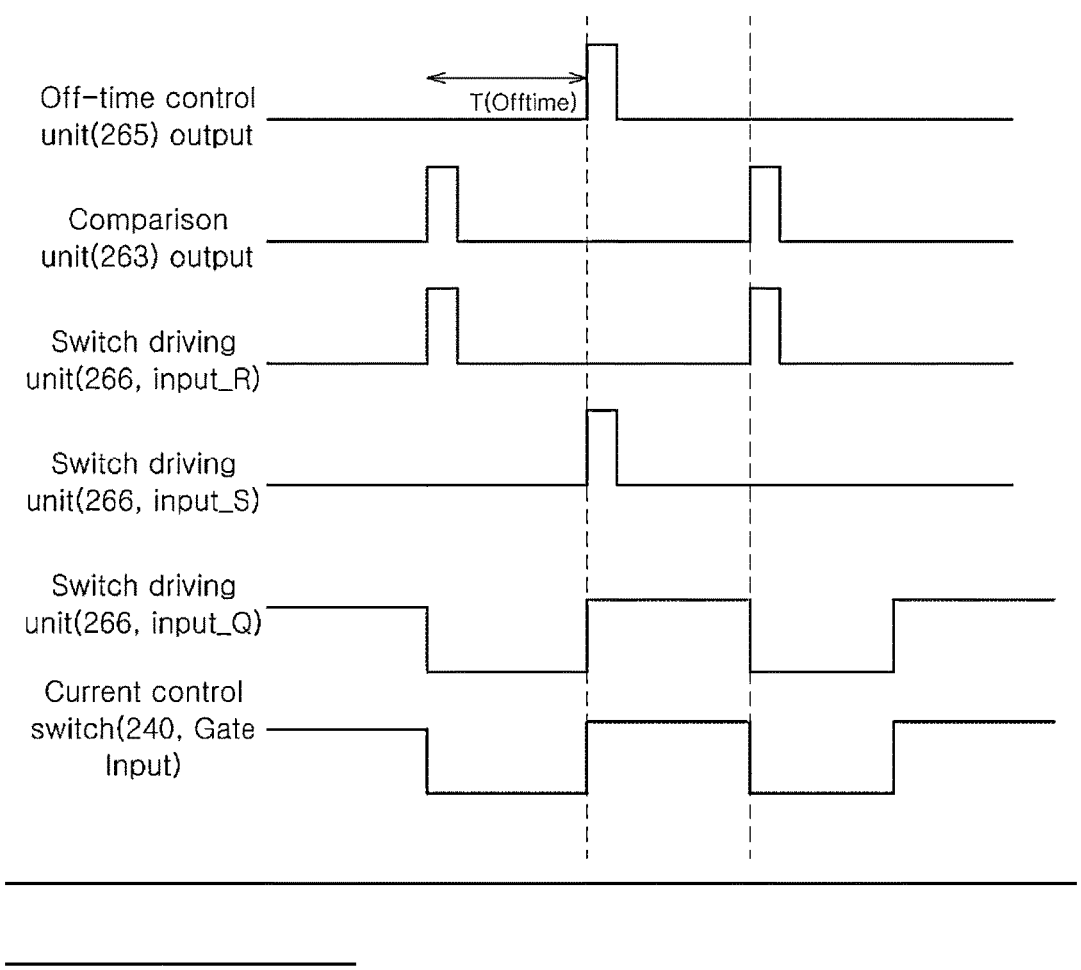
FIG. 10 illustrates waveform diagrams of outputs in a switch control circuit.

FIG. 10 illustrates waveform diagrams of outputs in a switch control circuit 260.

Referring to FIG. 10, when outputs of the off-time control unit 265 and the comparison unit 263 are respectively inputted into input terminals S and R of the SR latch and a high level signal, for example, a value of 1, is inputted to an input terminal S of switch driving unit 266, the SR latch takes on a state of SET so as to output a control signal that turn on the current control switch 240 that controls an output terminal Q. Subsequently, when a high level signal, for example, a value of 1 or a positive signal, is inputted to an input terminal R according to an output of the comparison unit 263, the SR latch takes on a state of RESET so as to output a control signal that turns off the current control switch 240 for an output terminal Q. Meanwhile, in response to an output of the comparison unit 263 reaching a high level, the off-time control unit 265 outputs a low level signal.

As a result, the switch control circuit 260 quickly and accurately controls a current of the load 210. Further, the switch control circuit 260 performs folding while the current control switch 240 is in a turned-on state so as to reflect changes of an input power and an output in real time. As a result, examples are able to control an average current of the load with improved efficacy in comparison with other technology.

Figure 3:
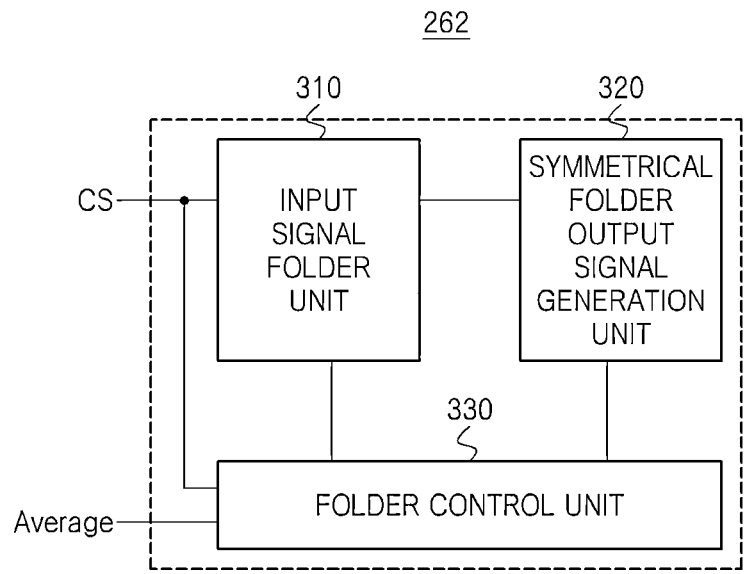
FIG. 3 is a block diagram illustrating a folder unit in the example of FIG. 2.

FIG. 3 is a block diagram illustrating a folder unit in the example of FIG. 2.

Referring to FIG. 3, the folder unit 262 includes an input signal folder unit 310, a symmetrical folder output signal generation unit 320 and a folder control unit 330.

The input signal folder unit 310 receives a sensing signal Vcs1 in a CS terminal and outputs a first folder output signal folding the received sensing signal Vcs1 according to a control provided by a folder control unit 330. For example, when a control signal of the folder control unit 330 is 1 or in a high state, the input signal folder unit 310 outputs the first folder output signal folding a signal measured in a CS terminal with reference to a first reference voltage VREF. In an example, the first reference voltage is provided through an average terminal.

The symmetrical folder output signal generation unit 320 receives an output signal of the input signal folder unit 310, for example, the first folder output signal. The symmetrical folder output signal generation unit 320 thus acts to generate a second folder output signal that is symmetrical with the first folder output signal according to a control of the folder control unit 330. For example, the symmetrical folder output signal generation unit 320 may generate the second folder output signal being symmetrical with the first folder output signal with reference to the first reference voltage VREF.

The folder control unit 330 controls the input signal folder unit 310 and the symmetrical folder output signal generation unit 320 based on a sensing signal that is measured in the CS terminal and the first reference voltage VREF.

In one example, the folder control unit 330 compares the sensing signal measured in the CS terminal and the first reference voltage VREF. When the measured sensing signal is lower than the first reference voltage VREF, the folder control unit 330 controls the input signal folder unit 310 so that the input signal folder unit 310 outputs a first folder output signal that is proportional to an input signal. Thus, in response to the measured sensing signal being higher than the first reference voltage VREF, the folder control unit 330 controls the input signal folder unit 310 so that the input signal folder unit 310 outputs a first folder output signal that is symmetrical with an input signal with reference to the first reference voltage VREF.

A detailed configuration of the folder unit 262 in FIG. 2 is now further described with reference to FIGS. 4 through 9.

Figure 4:
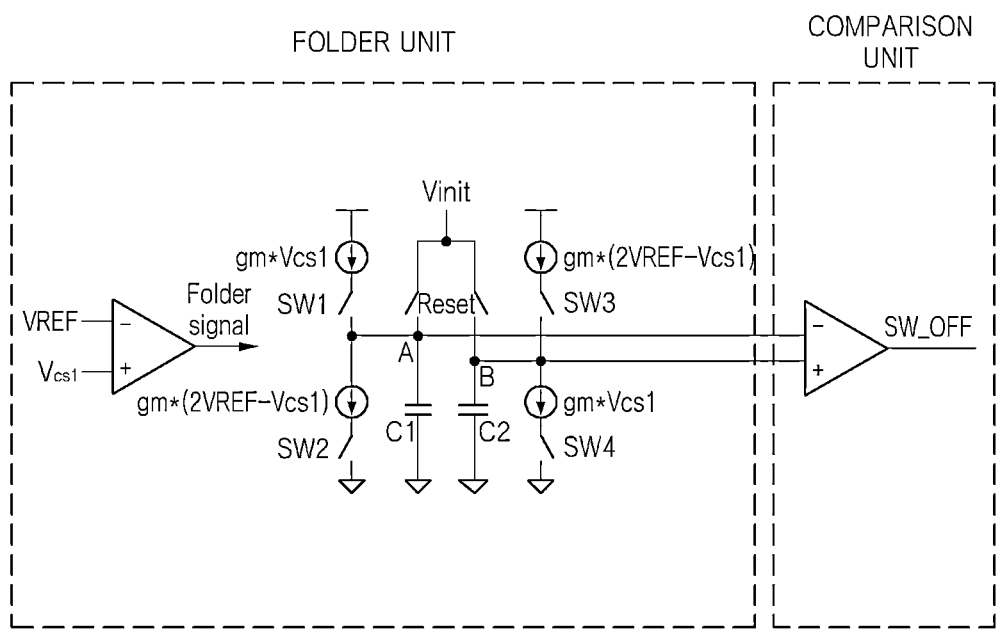
FIG. 4 is a circuit diagram illustrating an example of a folder unit in the example of FIG. 2.

FIG. 4 is a circuit diagram illustrating an example of a folder unit in the example of FIG. 2.

Referring to the example of FIG. 4, a folder control unit 330 is implemented in this example as a differential amplifier. An input signal folder unit 310 and a symmetrical folder output signal generation unit 320 are respectively implemented in this example as a pair of current sources and a capacitor.

Further, the folder control unit 330 respectively receives a first reference voltage VREF and a sensing signal Vcs1 through its terminals. FIG. 4 illustrates an example where the folder control unit 330 receives a first reference voltage VREF through its negative terminal and a sensing signal Vcs1 through its positive terminal. Based on its inputs, the folder control unit 330 acts to output a comparison result as a folder signal that controls the input signal folder unit 310 and the symmetrical folder output signal generation unit 320.

In one example, the folder control unit 330 outputs a folder signal having a value of 0 or a low level in response to a sensing signal Vcs1 being lower than the first reference voltage VREF and the folder control unit 330 outputs a folder signal having a value of 1 or a high level in response to a sensing signal Vcs1 being higher than the first reference voltage VREF.

As illustrated in the example of FIG. 4, the input signal folder unit 310 includes a pair of left current sources and a first capacitor C1 and also includes a pair of switches SW1 and SW2 that couple or block the pair of current sources and the first capacitor C1.

The pair of current sources has a pair of signal that are symmetrical with each other with reference to a contact point of the sensing signal Vcs1 and the first reference voltage VREF. Hence, as illustrated in FIG. 4, a first current source has a signal value of "gm*Vcs1" that is proportional to the sensing signal Vcs1 and a second current source has a signal value of "gm*(2VREF−Vcs1)". Hence, these values are symmetrical with each other with reference to the contact point of the sensing signal Vcs1 and the first reference voltage VREF. A pair of switches operates exclusively with one another according to a control signal of the folder control unit 330, for example a folder signal. For example, when a folder signal of the folder control unit 330 has a value of 0 or a low level, a first switch SW1 is turned on and a second switch SW2 is turned off. Meanwhile, when a folder signal has a value of 1 or a high level, the first switch SW1 is turned off and the second switch SW2 is turned on. Hence, at any point in time, one of SW1 and SW2 is on and the other switch is off.

As a result, the input signal folder unit 310 outputs a voltage originating in the first charged capacitor C1, that is, a voltage integrating current flowing into a pair of current sources, as the first folder output signal to a node A according to a control operation of the input signal folder unit 310.

As illustrated in the example of FIG. 4, the symmetrical folder output signal generation unit 320 includes a pair of right current sources and a capacitor C2 and also includes a pair of switches SW3 and SW4 that couple or block the pair of current sources and the second capacitor C2.

The pair of current sources on the right is symmetrical with each other with reference to a contact point of the sensing signal Vcs1 and the first reference voltage VREF. As illustrated in the example of FIG. 4, a third current source has a signal value of "gm*(2VREF−Vcs1)" and a fourth current source has a signal value of "gm*Vcs1".

A pair of switches operates exclusively with each other according to a control signal of the folder control unit 330, that is, a folder signal. For example, in response to a folder signal of the folder control unit 330 having a value of 0 or a low level, a third switch SW3 is turned off and a fourth switch SW4 is turned on. Also, in response to a folder signal having a value of 1 or a high level, the third switch SW3 is turned on and the fourth switch SW4 is turned off.

As a result, the symmetrical folder output signal generation unit 320 outputs a voltage originating in the second charged capacitor C2, that is, a voltage integrating current flowing into a pair of current sources, as the second folder output signal into a node B according to a control operation of the control unit.

In one example, the input signal folder unit 310 and the symmetrical folder output signal generation unit 320 are reset according to a control operation of the folder control unit 330. For example, the nodes A and B respectively coupled to the first and second capacitors are, in this example, coupled to an initialization voltage Vinit according to a folder signal of the folder control unit 330. Also, in an example, the folder control unit 330 periodically initializes first and second folder output signals with the initialization voltage Vinit. In this example, the initialization voltage Vinit corresponds to a voltage defined inside of a component.

Figure 5:
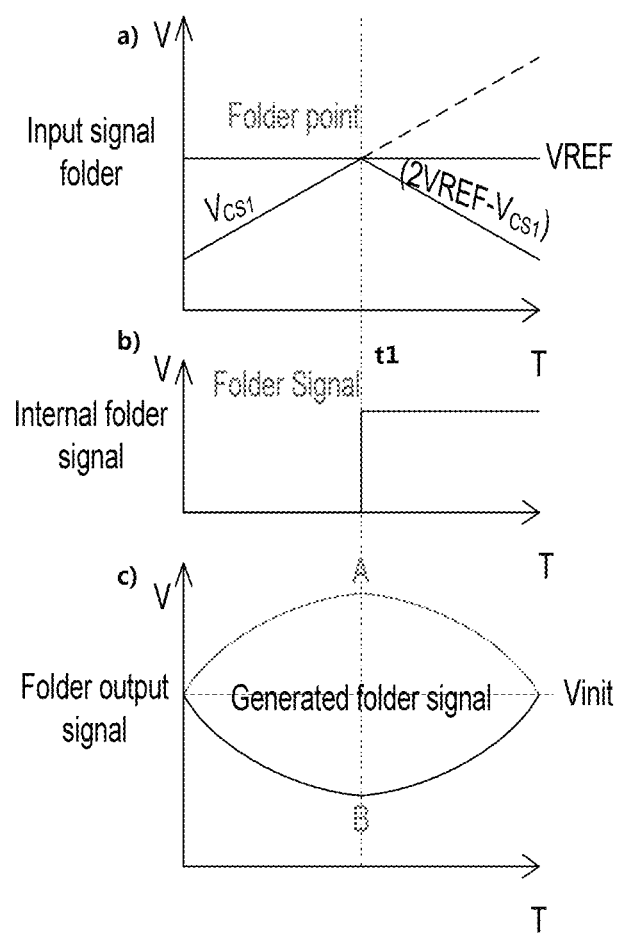
FIG. 5 illustrates waveform diagrams of signals outputted from the folder unit of FIG. 4.

FIG. 5 illustrates waveform diagrams of signals outputted from the folder unit of FIG. 4.

Referring to subdiagrams (a), (b) and (c) of FIG. 5, an x-axis and a y-axis respectively represent a time and a voltage. Corresponding positions on x-axes in subdiagrams (a), (b) and (c) of FIG. 5 represent a same time.

A measured sensing signal Vcs1 is assumed to increase as time elapses.

As illustrated in FIG. 5 at (a) and (b), when the measured sensing signal Vcs1 is less than the first reference voltage VREF in a time interval 0 through t1, an internal folder signal of the folder control unit 330 has a value of 0 or a low level and when the measured sensing signal Vcs1 is lower than the first reference voltage VREF after a time interval t1, the internal folder signal of the folder control unit 330 has a value of 1 or a high level. Herein, an intersection point between the Vcs1 and the VREF corresponds to a folding point.

Referring to FIG. 5 at (c), the input signal folder 310 and the symmetrical folder output signal generation unit 320 are expected to be initialized as having an initialization voltage Vinit at a time of 0.

The input signal folder unit 310 outputs a first folder output signal by integrating "gm*Vcs1" in response to a control signal having a value of 0 in a time interval of 0 through t1. Otherwise, at a time that falls after this time interval, the input signal folder 310 outputs a first folder output signal integrating "gm*(2VREF−Vcs1)" in response to a control signal having a value of 1 or a high level after a time interval t1. That is, the input signal folder unit 310 outputs a first folder output signal that is proportional to an area valued derived by integrating a graph area under the graphs of measured sensing signal Vcs1 and (2VREF−Vcs1) in FIG. 5.

The symmetrical folder output signal generation unit 320 operates in an opposing manner with respect to the input signal folder unit 310. Therefore, the symmetrical folder output signal generation unit 320 outputs a second folder output signal that is symmetrical to the first folder output signal with reference to the initialization voltage.

Figure 6:
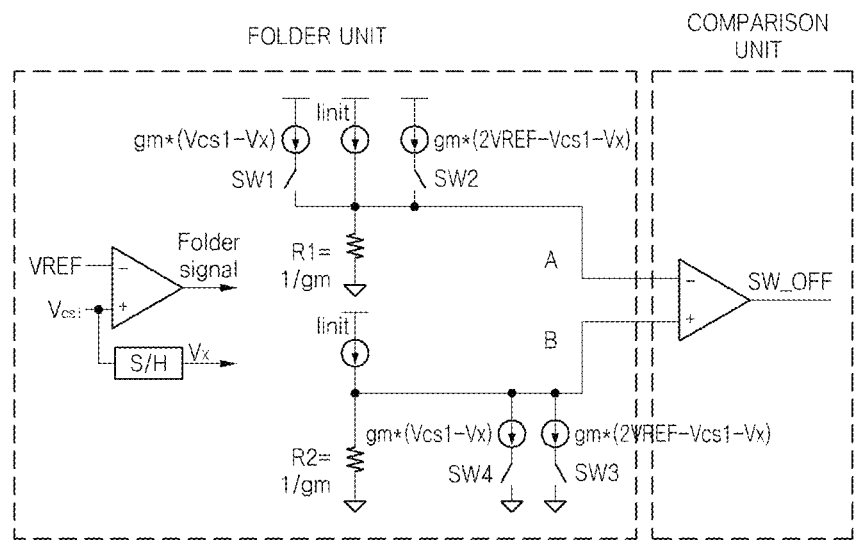
FIG. 6 is another circuit diagram illustrating an example of a folder unit in the example of FIG. 2.

FIG. 6 is another circuit diagram illustrating an example of a folder unit in the example of FIG. 2.

Referring to FIG. 6, a folder control unit 330 includes a differential amplifier and an input signal folder unit 310 and a symmetrical folder output signal generation unit 320 that respectively include a pair of current sources and a resistor.

Further, the folder control unit 330 respectively receives the first reference voltage VREF and the measured sensing signal Vcs1 through negative and positive terminals to output, as a folder signal, a comparison result controlling the input signal folder unit 310 and the symmetrical folder output signal generation unit 320. Also, the folder control unit 330 samples a starting point Vcs1, for example, Vx, that corresponds to a value of Vcs1 at a time of starting to generate the folder output signal and holds the Vx at a stable value for a specific time.

In one example, the folder control unit 330 outputs a folder signal having a value of 0 or a low level when the sensing signal Vcs1 is lower than the first reference voltage VREF and outputs a folder signal having a value of 1 or a high level when the sensing signal Vcs1 is higher than the first reference voltage VREF.

As illustrated in FIG. 6, the input signal folder unit 310 includes a pair of upper current sources and a resistor R1 series-coupled to the pair of upper current sources. The input signal folder unit 310 also includes a pair of switches SW1 and SW2 that couple or block a pair of current sources and the first resistor R1.

A pair of current sources is symmetrical to one each other with reference to a contact point of "VREF−Vx (sampled Vcs1)". As illustrated in FIG. 6, a first current source has a signal value of "gm*(Vcs1−Vx)" that is proportional to the sensing signal Vcs1 and a second current source has a signal value of "gm*(2VREF−Vcs1−Vx)".

A pair of switches operates exclusively with each other according to a control signal of the folder control unit 330, that is, a folder signal. For example, when a folder signal of the folder control unit 330 has a value of 0 or a low level, a first switch SW1 is turned on and a second switch SW2 is turned off. Meanwhile, when a folder signal has a value of 1 or a high level, a first switch SW1 is turned off and a second switch SW2 is turned on. As a result, the input signal folder unit 310 outputs a voltage applied to the first resistor R1 as the first folder output signal to a node A according to a control signal of the control unit. In this example, a value of the first resistor R1 corresponds to "1/gm" where gm refers to a proportionality constant of the current source".

As illustrated in FIG. 6, the symmetrical folder output signal generation unit 320 includes a pair of lower current sources and a second resistor R2. The symmetrical folder output signal generation unit 320 also includes a pair of switches SW3 and SW4 that couple or block the pair of current sources and the second resistor R2.

A pair of current sources is symmetrical with each other with reference to an intersection point of the graphs of "VREF−Vx", where Vx is a sampled value of Vcs1, and the sensing signal Vcs1. As illustrated in FIG. 6, a third current source has a signal of "gm*(2VREF−Vcs1−Vx)" and a fourth current source has a signal of "gm*(Vcs1−Vx)".

A pair of switches operates exclusively with each other according to a control signal provided by the folder control unit 330, that is, a folder signal. For example, when a folder signal of the folder control unit 330 has a value of 0 or a low level, a third switch SW3 is turned off and a fourth switch SW4 is turned on. Also, when a folder signal has a value of 1 or a high level, a third switch SW3 is turned on and a fourth switch SW4 is turned off.

Thus, the symmetrical folder output signal generation unit 320 outputs a voltage applied to the second resistor R2 as the second folder output signal to a node B according to a control signal of the control unit. In this example, a value of the second resistor R2 corresponds to "1/gm" where gm refers to a proportionality constant of the current source.

In one example, the input signal folder unit 310 and the symmetrical folder output signal generation unit 320 are reset according to a control signal of the folder control unit 330. For example, the nodes A and B that are respectively coupled to the first and second resistors R1 and R2 are coupled to an initialization current source Iinit according to a folder signal of the folder control unit 330. Also, in an example, the folder control unit 330 periodically initializes first and second folder output signals by using the initialization current source Iinit.

Figure 7:
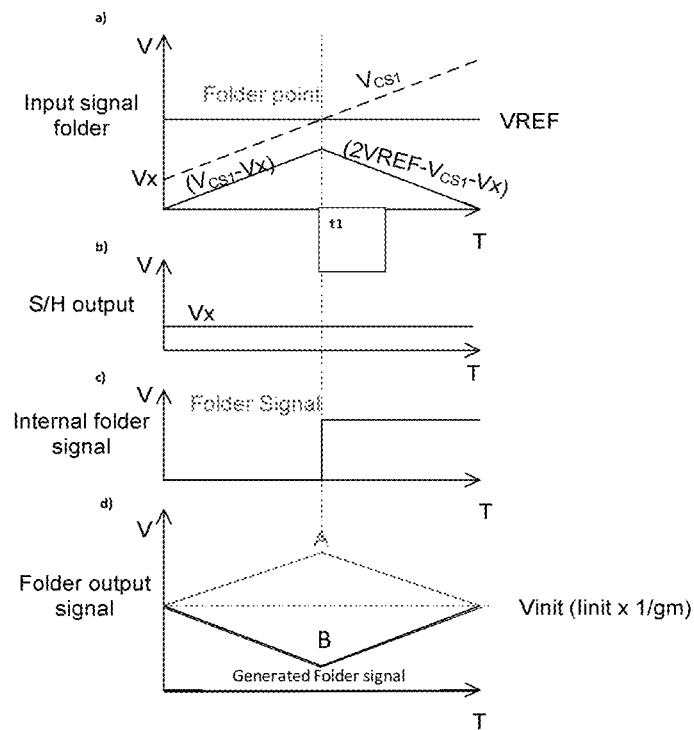
FIG. 7 illustrates waveform diagrams of signals outputted from the folder unit in the example of FIG. 5.

FIG. 7 illustrates waveform diagrams of signals outputted from the folder unit in the example of FIG. 5.

Referring FIG. 7 at (a) through (d), an x-axis and a y-axis respectively represent a time and a voltage and corresponding portions of the x-axes in FIG. 7 at (a) through (d) represent a corresponding time.

A measured sensing signal Vcs1 is assumed to increase as time elapses.

As illustrated in FIG. 7 at (a) and (c), when the measured sensing signal Vcs1 is lower than the first reference voltage VREF in a time interval from 0 to t1, an internal folder signal of the folder control unit 330 has a value of 0 or a low level and when the measured sensing signal Vcs1 is higher than the first reference voltage VREF after a time interval t1, an internal folder signal of the folder control unit 330 has a value of 1 or a high level. Thus, a contact point of the Vcs1 and the VREF corresponds to a folder point.

In FIG. 7 at (b), a Vx signal is generated by sampling and holding the sensing signal Vcs1 at a start time 0 and Vx is maintained during a specific interval, such as one period.

Referring to FIG. 7 at (d), the input signal folder 310 and the symmetrical folder output signal generation unit 320 are assumed to initialize a voltage with an initialization voltage Vinit at a time 0. In this example, the initialization Vinit is represented as the initialization current source Iinit and a proportionality constant of the current source gm. That is Vinit is determined as, "Vinit=Iinit*1/gm".

In FIG. 7, the input signal folder unit 310 outputs a first folder output signal such as "Vcs1−Vx" when a control signal has a value of 0 in a time interval of 0 through t1. Otherwise, the input signal folder 310 outputs a first folder output signal such as "2VREF−Vcs1−Vx" when a control signal has a value of 1 or a high level after a time interval t1.

The symmetrical folder output signal generation unit 320 operates in an opposing manner with respect to the input signal folder unit 310, and as a result, outputs a second folder output signal that is symmetrical with the first folder output signal with reference to the initialization voltage.

Figure 8:
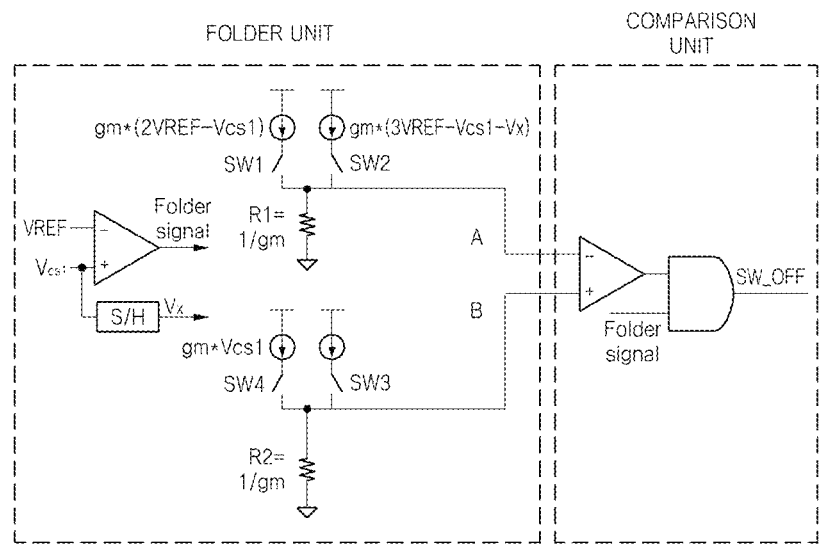
FIG. 8 is another circuit diagram illustrating an example of a folder unit in the example of FIG. 2.

FIG. 8 is another circuit diagram illustrating an example of a folder unit in the example of FIG. 2.

Referring to FIG. 8, a folder control unit 330 includes a differential amplifier as described with respect to FIG. 6. Such a structure has been described above and the description is not repeated, for brevity. An input signal folder unit 310 and a symmetrical folder output signal generation unit 320 each respectively include a pair of current sources and a resistor.

The folder control unit 330, the input signal folder unit 310 and the symmetrical folder output signal generation unit 320 are substantially same as corresponding elements in FIG. 6, and therefore components and aspects different from those in FIG. 6 are described further.

As illustrated in FIG. 8, the input signal folder unit 310 includes a pair of lower current sources and a resistor R2 series-coupled to the pair of lower current sources. The input signal folder unit 310 also includes a pair of switches SW3 and SW4 that couple or block the pair of current sources and the second resistor R2.

As illustrated in FIG. 8, a fourth current source has a signal value of "gm*Vcs1" that is proportional to the sensing signal Vcs1 and a third current source has a signal value of "gm*(Vcs1−VREF+Vx)".

A pair of switches operates exclusively with each other according to a control signal of the folder control unit 330, that is, a folder signal. For example, when a folder signal of the folder control unit 330 has a value of 0 or a low level, a fourth switch SW4 is turned on and a third switch SW3 is turned off. Meanwhile, when a folder signal has a value of 1 or a high level, a fourth switch SW4 is turned off and a third switch SW3 is turned on.

Thus, the input signal folder unit 310 outputs a voltage applied to the second resistor R2 as the first folder output signal to a node B.

As illustrated in FIG. 8, the symmetrical folder output signal generation unit 320 also includes a pair of upper current sources, and a first resistor R1. The symmetrical folder output signal generation unit 320 also includes a pair of switches SW1 and SW2 that couple or block the pair of current sources and the first resistor R1.

A second current source has a signal value of "gm*(3VREF−Vcs1−Vx)" and a first current source has a signal value of "gm*(2VREF−VCS1)" that is proportional to the sensing signal Vcs1.

A pair of switches operates exclusively with each other according to a control signal of the folder control unit 330, that is, a folder signal. For example, when a folder signal of the folder control unit 330 has a value of 0 or a low level, a second switch SW2 is turned off and a first switch SW1 is turned on. Meanwhile, when a folder signal has a value of 1 or a high level, a second switch SW2 is turned on and a first switch SW1 is turned off.

Thus, the symmetrical folder output signal generation unit 320 outputs a voltage applied to the first resistor R1 as the second folder output signal to a node A according to a control signal of the control unit.

Meanwhile, the comparison unit includes a differential amplifier and a logical AND operator. In this example, when first and second folder output signals, that is, input signals of the differential amplifier, are the same and the first reference voltage VREF and the sensing signal Vcs1 are same value, that is, the folder signal has a value of 1 or a high level, the comparison unit outputs a switch off signal.

Figure 9:
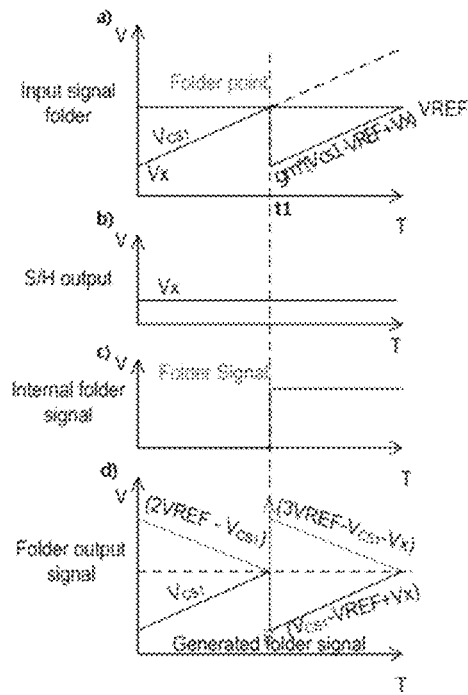
FIG. 9 illustrates waveform diagrams of a folder output signal outputted from the folder unit in the example of FIG. 8.

FIG. 9 illustrates waveform diagrams of a folder output signal outputted from the folder unit in the example of FIG. 8.

Referring FIG. 9 at (a) through (d), an x-axis and a y-axis respectively represent a time and a voltage and corresponding portions of all the x-axes in FIG. 9 at (a) through (d) represent corresponding times.

The measured sensing signal Vcs1 is expected to increase as time elapses. As described earlier, when the sensing signal Vcs1 is less than the first reference voltage VREF in a time interval of 0 through t1, an internal folder signal of the folder control unit 330 has a value of 0 or a low level and when the sensing signal Vcs1 is higher than the first reference voltage VREF after a time interval t1, an internal folder signal of the folder control unit 330 has a value of 1 or a high level.

FIG. 9 at (b) illustrates a signal Vx that is generated by sampling and holding a value of the sensing signal Vcs1.

Referring to FIG. 9 at (d), a fourth switch is turned on when a control signal has a value of 0 in a time interval of 0 through t1 and the input signal folder unit 310 outputs a first folder output signal value such as "Vcs1". A third switch is turned on when a control signal has a value of 1 or a high level after a time interval t1 and the input signal folder unit 310 outputs a first folder output signal value such as "Vcs1−VREF+Vx".

A first switch is turned on when a control signal has a value of 0 in a time interval of 0 through t1 and the symmetrical folder output signal generation unit 320 outputs a second folder output signal value such as "2VREF−Vcs1". A second switch is turned on when a control signal has a value of 1 or a high level after a time interval t1 and the symmetrical folder output signal generation unit 320 outputs a second folder output signal value such as "3VREF−Vcs1−Vx".

Figure 11:
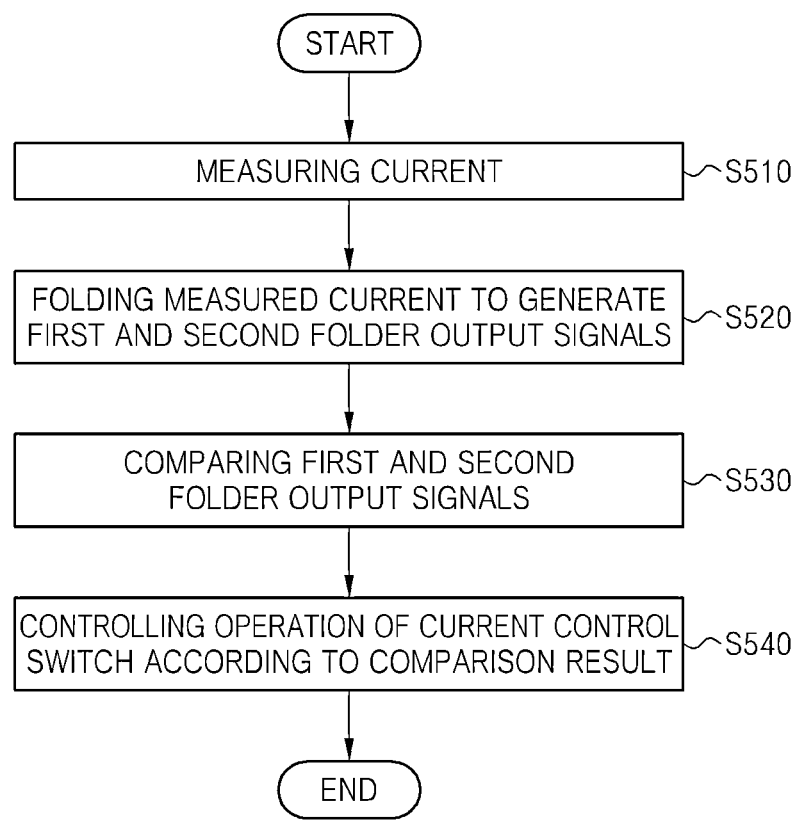
FIG. 11 is a flow diagram illustrating a switch control method according to an example.

FIG. 11 is a flow diagram illustrating a switch control method according to an example.

Referring to FIG. 11, a switch control method is performed in a switch control circuit 260 that controls an average current flowing into a load through a current control switch that is series-coupled to an input power and the load.

In stage S510, the switch control circuit 260 measures a sensing signal flowed to the load through the sensing unit 261.

In stage S520, the switch control circuit 260 folds the measured sensing signal with reference to a contact point of the first reference voltage VREF to generate first and second folder output signals that are symmetrical with each other based on the initialization voltage Vinit or the first reference voltage VREF.

As described earlier, the folder unit generates first and second folder output signals that are respectively increased and decreased in proportion to the measured sensing signal and respectively fold the first and second folder output signals at a time at which the first or second folder output signal reaches a first reference value.

In stage S530, the switch control circuit 260 compares the first and second folder output signals generated in the comparison unit 263.

In stage S540, the switch control circuit 260 controls an operation of the current control switch 240 according to a comparison result in the control unit 264.

Further, as described earlier, in an example, the comparison unit 263 in the switch control circuit 260 compares the first and second folder output signals. The switch control circuit 260 turns off the current control switch 240 at a time at which the first and second folder output signals are the same. Also, when the first and second folder output signals are the same and the folder signal has a value of 1 or a high level, the switch control circuit 260 turns off the current control switch 240. When a predefined off-time elapses from a turn-off time of the current control switch 240, the switch control circuit 260 turns on the current control switch 240.

In one example, the switch control circuit 260 counts a predefined off-time from a turn-off time of the current control switch 240 through the off-time control unit 265 and controls the current control switch 240 based on an output of the comparison unit 262 and an output of the off-time control unit 265 in the switch driving unit 266.

Therefore, the switch control circuit 260 controls a load current in real time. Also, although an offset occurs in a measured current, the switch control circuit 260 uses the first and second folder output signals to accurately provide current control functionality.

The spatially-relative expressions such as "below", "beneath", "lower", "above", "upper", and the like may be used to conveniently describe relationships of one device or elements with other devices or among elements. The spatially-relative expressions should be understood as encompassing the direction illustrated in the drawings, added with other directions of the device in use or operation. Further, the device may be oriented to other directions and accordingly, the interpretation of the spatially-relative expressions is based on the orientation.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be selfmountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switch control circuit for controlling an average current flowing into a load through a current control switch that is series-coupled to an input power and the load, the switch control circuit comprising:
   a sensing unit configured to measure a current flowing into the load;
   a folder unit configured to fold a sensing signal related to the measured current based on a first reference voltage to generate first and second folder output signals based on an initialization voltage, the first and second folder output signals being symmetric to each other;
   a comparison unit configured to compare the generated first and second folder output signals; and
   a control unit configured to control an operation of the current control switch according to a comparison result of the comparison unit.

2. The switch control circuit of claim 1, wherein the control unit is coupled to the current control switch, turns off the current control switch at a time at which the comparison result in the comparison unit is that the compared signals are the same and turns on the current control switch in response to a predefined off-time elapsing from a time when the current control switch is turned off.

3. The switch control circuit of claim 1, wherein the sensing unit comprises a sensing resistor coupled between one terminal of the current control switch and a reference voltage, and measures a voltage at both sides of the sensing resistor.

4. The switch control circuit of claim 1, wherein the folder unit comprises:
   an input signal folder unit configured to fold the measured sensing signal according to a control signal to generate a first folder output signal;
   a symmetrical folder output signal generation unit configured to generate a second folder signal based on the first folder output signal according to the control signal; and
   a folder control unit configured to compare the measured sensing signal and the first reference voltage to generate the control signal, wherein the control signal controls operation of the input signal folder unit and the symmetrical folder output signal generation unit.

5. The switch control circuit of claim 4, wherein the folder control unit comprises a differential amplifier configured to convert an amplitude or a phase of the control signal when the measured sensing signal and the first reference voltage are the same.

6. The switch control circuit of claim 5, wherein the folder unit comprises:
   a first dependent current source configured to be proportional to the measured sensing signal;
   a second dependent current source configured to decrease in proportion to the measured sensing signal with reference to the first reference voltage;
   a first capacitor that is series-coupled to the first and second dependent current sources; and
   first and second switches configured to operate exclusively according to the control signal so as to couple each of the first and second dependent current sources to the first capacitor,
   wherein the folder unit outputs a charged voltage from the first capacitor as the first folder output signal.

7. The switch control circuit of claim 6, wherein the symmetrical folder output signal generation unit comprises:
   a third dependent current source configured to decrease in proportion to the measured sensing signal with reference to the first reference voltage;
   a fourth dependent current source configured to be proportional to the measured sensing signal;
   a second capacitor that is series-coupled to the third and fourth dependent current sources; and
   third and fourth switches configured to operate exclusively according to the control signal so as to couple each of the third and fourth dependent current sources to the second capacitor,
   wherein the symmetrical folder output signal generation unit outputs a charged voltage from the second capacitor as the second folder output signal.

8. The switch control circuit of claim 7, further comprising:
   an initialization circuit that is series-coupled to at least one of the first and second capacitors so as to initialize at least one of the first and second folder output signals.

9. The switch control circuit of claim 4, wherein the folder control unit comprises:
   a differential amplifier configured to convert an amplitude and a phase of the control signal in response to the measured sensing signal and the first reference voltage being the same; and
   a sampling unit configured to sample the measured sensing signal at a specific time so as to hold the sampled sensing signal during a specific interval and to output the held sensing signal as a second reference voltage.

10. The switch control circuit of claim 9, wherein the input signal folder unit comprises:
    a first dependent current source configured to be proportional to a difference between the measured sensing signal and the second reference voltage;
    a second dependent current source configured to decrease in proportion to the measured sensing signal, based on a difference of the first and second reference voltages;
    a first resistor that is series-coupled to the first and second dependent current sources; and
    first and second switches configured to operate exclusively according to the control signal so as to couple each of the first and second dependent current sources to the first resistor, wherein the input signal folder unit outputs a voltage that is applied to the first resistor as the first folder output signal.

11. The switch control circuit of claim 10, wherein the symmetrical folder output signal generation unit comprises:
a third dependent current source configured to decrease in proportion to the measured sensing signal based on a difference between the first and second reference voltages;
a fourth dependent current source configured to be proportional to the difference between the measured sensing signal and the second reference voltage;
a second resistor that is series-coupled to the third and fourth dependent current sources; and
third and fourth switches configured to operate exclusively according to the control signal so as to couple each of the third and fourth dependent current sources to the second resistor,
wherein the symmetrical folder output signal generation unit outputs a voltage that is applied to the second resistor as the second folder output signal.

12. The switch control circuit of claim 11, further comprising:
an initialization circuit that is series-coupled to at least one of the first and second resistors so as to initialize at least one of the first and second folder output signals.

13. The switch control circuit of claim 1, wherein the control unit comprises:
an off-time control unit configured to count a predefined off-time from a time at which the current control switch is turned off; and
a switch driving unit configured to control the current control switch based on an output of the comparison unit and an output of the off-time control unit.

14. The switch control circuit of claim 13, wherein the switch driving unit comprises an SR latch that performs NOR or NAND logic operations on outputs of the comparison unit and the off-time control unit.

15. A switch control circuit for controlling an average current flowing into a load through a current control switch that is series-coupled to an input power and the load, the switch control circuit comprising:
a sensing unit configured to measure a current flowing into the load;
a folder unit configured to fold a sensing signal related to the measured current based on a first reference voltage to generate first and second folder output signals based on the first reference voltage, the first and second folder output signals being symmetric to each other;
a comparison unit configured to perform an AND logical operation on a comparison result and a folder signal and to output the AND operation result, the comparison result being generated by comparing the generated first and second folder output signals and the folder signal being generated by comparing the sensing signal and the first reference voltage; and
a control unit configured to control an operation of the current control switch according to a comparison result of the comparison unit.

16. The switch control circuit of claim 15, wherein the folder unit comprises:
an input signal folder unit configured to fold the measured sensing signal according to a control signal so as to generate a first folder output signal;
a symmetrical folder output signal generation unit configured to generate a second folder signal based on the first folder output signal, according to the control signal; and
a folder control unit configured to compare the measured sensing signal and the first reference voltage to generate the control signal, wherein the control signal controls operation of the input signal folder unit and the symmetrical folder output signal generation unit.

17. The switch control circuit of claim 16, wherein the input signal folder unit comprises:
a first dependent current source configured to decrease in proportion to a difference between the first reference voltage and the measured sensing signal;
a second dependent current source configured to decrease in proportion to the measured sensing signal based on a difference of the first and second reference voltages;
a first resistor that is series-coupled to the first and second dependent current sources; and
first and second switches configured to operate exclusively according to the control signal so as to couple each of the first and second dependent current sources to the first resistor,
wherein the input signal folder unit outputs a voltage applied to the first resistor as the first folder output signal.

18. The switch control circuit of claim 16, wherein the symmetrical folder output signal generation unit comprises:
a third dependent current source configured to increase in proportion to the measured sensing signal based on a difference between the second and first reference voltages;
a fourth dependent current source configured to increase in proportion to the sensing signal;
a second resistor that is series-coupled to the third and fourth dependent current sources; and
third and fourth switches configured to operate exclusively according to the control signal so as to couple each of the third and fourth dependent current sources to the second resistor,
wherein the symmetrical folder output signal generation unit outputs a voltage applied to the second resistor as the second folder output signal.

19. The switch control circuit of claim 15, wherein the control unit comprises:
an off-time control unit configured to count a predefined off-time from a time when the current control switch is turned off; and
a switch driving unit configured to control the current control switch based on an output of the comparison unit and an output of the off-time control unit.

20. The switch control circuit of claim 19, wherein the switch driving unit comprises an SR latch that performs NOR or NAND logic operations on outputs of the comparison unit and the off-time control unit.

21. A Continuous Current Mode (CCM) operation converter comprising:
a load that is series-coupled to input power;
an inductor that is series-coupled to the load;
a current control switch that is series-coupled to the inductor to control a current flowing into the load;
a freewheeling diode that is parallel-coupled to the load and the series-coupled inductor; and
a switch control circuit configured to control the current control switch,
wherein the switch control circuit comprises a sensing unit configured to measure a current flowing into the load, a folder unit configured to fold a sensing signal related to the measured current based on a first reference voltage to generate first and second folder output signals based on an initialization voltage, the first and second folder output signals being symmetric to each other, a comparison unit configured to compare the generated first and second folder output signals, and a control unit configured to control an operation of the current control switch according to a comparison result of the comparison unit.

22. A Continuous Current Mode (CCM) operation converter comprising:

a load that is series-coupled to input power;

an inductor that is series-coupled to the load;

a current control switch that is series-coupled to the inductor to control a current flowing into the load;

a freewheeling diode that is parallel-coupled to the load and the series-coupled inductor; and a switch control circuit configured to control the current control switch, wherein the switch control circuit comprises a sensing unit configured to measure a current flowing into the load, a folder unit configured to fold a sensing signal related to the measured current based on a first reference voltage to generate first and second folder output signals based on the first reference voltage, the first and second folder output signals being symmetric to each other, a comparison unit configured to perform an AND logical operation on a comparison result and a folder signal and to output the AND operation result, the comparison result being generated by comparing the generated first and second folder output signals and the folder signal being generated by comparing the sensing signal and the first reference voltage, and a control unit configured to control an operation of the current control switch according to a comparison result of the comparison unit.

* * * * *